US010129847B2

(12) United States Patent
Wu et al.

(10) Patent No.: US 10,129,847 B2
(45) Date of Patent: *Nov. 13, 2018

(54) TRANSMITTING LOCATION DATA IN WIRELESS NETWORKS

(71) Applicant: MICROSOFT TECHNOLOGY LICENSING, LLC, Redmond, WA (US)

(72) Inventors: Deyun Wu, Kirkland, WA (US); Thomas W. Kuehnel, Seattle, WA (US); Amer A. Hassan, Kirkland, WA (US); Yi Lu, Sammamish, WA (US); Hui Shen, Sammamish, WA (US); Sundar P. Subramani, Bellevue, WA (US); Vinod K. Swamy, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,806

(22) Filed: Nov. 10, 2016

(65) Prior Publication Data

US 2017/0064668 A1 Mar. 2, 2017

Related U.S. Application Data

(63) Continuation of application No. 14/817,011, filed on Aug. 3, 2015, now Pat. No. 9,544,872, which is a (Continued)

(51) Int. Cl.
*H04W 24/00* (2009.01)
*H04W 64/00* (2009.01)
(Continued)

(52) U.S. Cl.
CPC .......... *H04W 64/003* (2013.01); *G01C 21/20* (2013.01); *H04W 4/02* (2013.01)

(58) Field of Classification Search
CPC ......... H04W 4/00–4/06; H04W 4/185; H04W 4/22; H04W 8/10; H04W 8/12;
(Continued)

(56) References Cited

U.S. PATENT DOCUMENTS 5,850,444 A 12/1998 Rune
6,400,942 B1 6/2002 Hansson et al.
(Continued)

FOREIGN PATENT DOCUMENTS

EP 1298847 A1 4/2003
EP 1 760 654 A1 3/2007
(Continued)

OTHER PUBLICATIONS

CN Notice on Grant of Patent Right for Invention for Application No. 200880111344.2, dated Jun. 2, 2016.
(Continued)

*Primary Examiner* — San Htun
(74) *Attorney, Agent, or Firm* — Mark K. Young; Mayer & Williams PC

(57) ABSTRACT

A wireless access point in a wireless network that may be adapted to transmit location data indicating its location to other devices. In some embodiments, the location data may be embedded in a control message or other message used to broadcast information necessary for a device to establish a connection to the wireless access point. In terms of the Open Systems Interconnect (OSI) layered model of a network, layer 2 control messages, including beacons, probe responses, or other suitable transmissions may be used for control messages or announcement transmissions.

20 Claims, 8 Drawing Sheets

Related U.S. Application Data continuation of application No. 11/973,590, filed on Oct. 9, 2007, now Pat. No. 9,109,903.

(51) Int. Cl.
*G01C 21/20* (2006.01)
*H04W 4/02* (2018.01)
*H04M 1/663* (2006.01)

(58) Field of Classification Search
CPC . H04W 64/00–64/006; H04W 76/007; H04W 88/08–88/188
See application file for complete search history.

(56) References Cited

U.S. PATENT DOCUMENTS

| | | | |
|---|---|---|---|
| 6,664,925 | B1 | 12/2003 | Moore et al. |
| 6,983,156 | B2 | 1/2006 | Fukushima et al. |
| 7,024,552 | B1 | 4/2006 | Caswell et al. |
| 7,054,627 | B1 | 5/2006 | Hillman |
| 7,092,943 | B2 | 8/2006 | Roese et al. |
| 7,095,319 | B2 | 8/2006 | Izumi |
| 7,149,499 | B1 | 12/2006 | Oran |
| 7,233,991 | B2 | 6/2007 | Adhikari |
| 7,243,233 | B2 | 7/2007 | Kindberg et al. |
| 7,317,914 | B2 | 1/2008 | Adya et al. |
| 7,336,942 | B2 | 2/2008 | Wang |
| 7,489,647 | B2 | 2/2009 | Shin |
| 7,493,127 | B2 | 2/2009 | Morgan et al. |
| 7,502,620 | B2 | 3/2009 | Morgan et al. |
| 7,856,234 | B2 | 12/2010 | Alizadeh-Shabdiz |
| 2003/0001776 | A1 | 1/2003 | Hannah |
| 2003/0217289 | A1 | 11/2003 | Ammon et al. |
| 2004/0006705 | A1 | 1/2004 | Walker |
| 2004/0051664 | A1 | 3/2004 | Frank |
| 2004/0068653 | A1 | 4/2004 | Fascenda |
| 2004/0213409 | A1 | 10/2004 | Murto |
| 2004/0239498 | A1 | 12/2004 | Miller |
| 2005/0068925 | A1* | 3/2005 | Palm ............ H04W 64/00 370/338 |
| 2005/0083929 | A1 | 4/2005 | Salo et al. |
| 2005/0125550 | A1 | 6/2005 | Bajikar |
| 2006/0030290 | A1 | 2/2006 | Rudolf |
| 2006/0036517 | A1 | 2/2006 | Walter |
| 2006/0039337 | A1 | 2/2006 | Hodoshima |
| 2006/0045056 | A1 | 3/2006 | O'Hara |
| 2006/0047835 | A1 | 3/2006 | Greaux |
| 2006/0075131 | A1* | 4/2006 | Douglas ........... G01S 5/0252 709/230 |
| 2006/0078123 | A1 | 4/2006 | Bichot et al. |
| 2006/0092899 | A1 | 5/2006 | Hong et al. |
| 2006/0095348 | A1* | 5/2006 | Jones ............. G01S 5/02 705/29 |
| 2006/0142004 | A1* | 6/2006 | He ................ H04W 48/16 455/434 |
| 2006/0187889 | A1 | 8/2006 | Mehta |
| 2006/0217131 | A1 | 9/2006 | Alizadeh-Shabdiz |
| 2007/0006098 | A1 | 1/2007 | Krumm |
| 2007/0021122 | A1 | 1/2007 | Lane et al. |
| 2007/0087764 | A1 | 4/2007 | Buckley et al. |
| 2007/0118587 | A1 | 5/2007 | Ishikawa et al. |
| 2007/0121557 | A1 | 5/2007 | Sylvain |
| 2007/0121560 | A1* | 5/2007 | Edge ............. H04W 64/00 370/338 |
| 2007/0123260 | A1 | 5/2007 | Kim |
| 2007/0141988 | A1 | 6/2007 | Kuehnel |
| 2007/0184845 | A1 | 8/2007 | Troncoso |
| 2007/0249366 | A1 | 10/2007 | Thomson et al. |
| 2008/0051092 | A1 | 2/2008 | Park et al. |
| 2008/0195457 | A1 | 8/2008 | Sherman et al. |
| 2008/0280624 | A1 | 11/2008 | Wrappe |
| 2009/0029728 | A1 | 1/2009 | Shen et al. |
| 2009/0088182 | A1* | 4/2009 | Piersol ............ H04W 48/12 455/456.1 |
| 2009/0094111 | A1 | 4/2009 | Wu |
| 2009/0214036 | A1 | 8/2009 | Shen |

FOREIGN PATENT DOCUMENTS

| | | | |
|---|---|---|---|
| KR | 2000001773 | A | 4/2000 |
| KR | 2006000264 | A | 1/2006 |

OTHER PUBLICATIONS

CN Notice on Reexamination for Application No. 200880111344.2, dated Mar. 31, 2015.
EP Communication for Application No. 08837485.5, dated Apr. 4, 2016.
CN Decision on Reexamination for Application No. 200880111344.2, dated Sep. 8, 2015.
Hildebrand et al., "XEP-0080: User Location", Date Apr. 6, 2014.
International Search Report dated Jun. 29, 2009, from corresponding International Application No. PCT/US2009/031451.
International Search Report dated Feb. 17, 2009 from corresponding International Application No. PCT/US2008/077388.
Koskela, "Combining WLAN Indoor Positioning and Multimedia Messaging Services", Proceedings of the 7th IASTED International Conference on Internet and Multimedia Systems and Applications, Aug. 13-15, 2003.
Quigley, "BlueStar, a privacy centric location aware system", Position, Location and Navigation Symposium 2004 (PLANS 2004), Apr. 26-29, 2004.
Jones, "What Where Wi: An Analysis of Millions of Wi-Fi Access Points", IEEE International Conference on Portable Information Devices, Mar. 25-29, 2007.
Polk, "Dynamic Host Configuration Protocol Option for Coordinate-based Location Configuration Information", Network Working Group, The Internet Society, Cisco Systems, Jul. 2004.
CN Notice on the Second Office Action for Application No. 200880111344.2, dated Nov. 5, 2012.
CN Decision on Rejection for Application No. 200880111344.2, dated Jan. 14, 2013.
CN First Office Action for Application No. 200880111344.2, dated Mar. 31, 2012.
Wong, "Wireless LAN Positioning with Mobile Devices in a Library Environment", Distributed Computing Systems Workshops, 2005, 25th IEEE International Conference, Jun. 6, 2005, pp. 633-636.
"Part 11: Wireless LAN Medium Access Control (MAC) and Physical Layer (PRY) Specifications, Amendment 3: Specification for operation in additional regulatory domans," IEEE Std. 802. 11d (2001).
802.11 Beacons Revealed http://wi-figurus.com/index2.php?option=com content&do pdf=1&id=47, 2 pages, Mar. 19, 2007.
New Networking Features in Windows Server 2008 and Windows Vista http://technet.microsoft.com/en-gb/library/bb726965(d=printer). aspx, 30 pages, Apr. 25, 2007.
U.S. Appl. No. 11/973,590, filed Oct. 9, 2007, Wu.
U.S. Appl. No. 14/817,011, filed Aug. 3, 2015, Wu.
State Intellectual Property Office of the People's Republic of China, Author unknown, CN Notice on the Third Office Action for Application No. 200880111344.2, dated Dec. 22, 2015, pp. 1-6, China.
European Patent Office, EP Communication for Application No. 08837485.5, dated Nov. 20, 2015, 7 Pages, Germany.
"First Examination Report Issued in Indian Patent Application No. 02140/CHENP/2010", dated Oct. 31, 2017, 6 Pages.
"Draft Amendment to Standard for Information Technology—Telecommunications and Information Exchange Between Systems—LAN/ MAN Specific Requirements—Part 11: Wireless Medium Access Control (MAC) and physical layer (PHY) specifications", In IEEE Draft: P802.11R-D0.09, IEEE-SA, vol. 802.11r, Issue D0.09, Sep. 22, 2005, 86 Pages.

(56) References Cited

OTHER PUBLICATIONS

"Office Action Issued in European Patent Application No. 08837485. 5", dated May 9, 2018, 12 Pages.

* cited by examiner

| 302 IE ID (1 byte) | 304 IE Length (1 byte) | 306 OUI (3 bytes) | 308 OUI Type (1 byte) | 310 Namespace (4 bytes) |
|---|---|---|---|---|
| 312 Type (1 byte) | 314 Value (1 ~ N bytes) ||||
300A
FIG. 3A
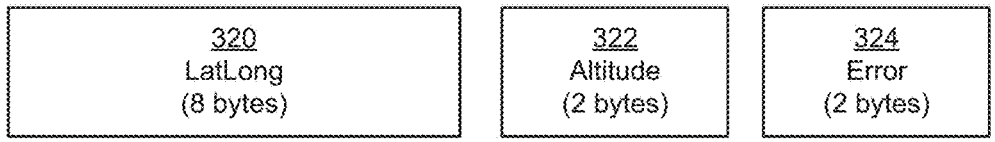
FIG. 3B
| 302 IE ID (1 byte) | 304 IE Length (1 byte) | 306 OUI (3 bytes) | 308 OUI Type (1 byte) | 310 Namespace (4 bytes) |
|---|---|---|---|---|
| 312 Type (1 byte) | 316 Length (1 byte) | 314 Value (1 ~ N bytes) |||
300C
FIG. 3C
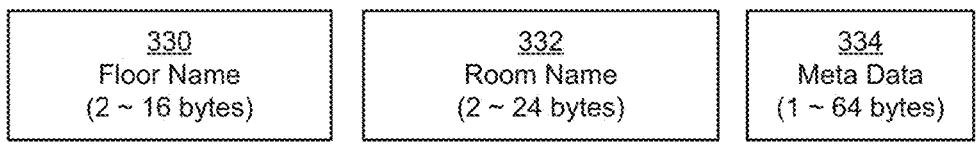
FIG. 3D

TRANSMITTING LOCATION DATA IN WIRELESS NETWORKS

RELATED APPLICATIONS

This Application is a Continuation of and claims benefit from U.S. patent application Ser. No. 14/817,011 that was filed Aug. 3, 2015, and that is a Continuation of U.S. patent application Ser. No. 11/973,590 (U.S. Pat. No. 9,109,903), filed Oct. 9, 2007 (issued Aug. 18, 2015), each of which is incorporated herein by reference in its entirety.

BACKGROUND OF INVENTION

Client devices have typically determined location information (i.e., the location of the client device) in one of two ways. First, a client device may be adapted to determine its geographic location from signals transmitted by a location system. For example, a client device may be equipped with hardware and/or software for calculating its position based on signals received from Global Positioning System (GPS) satellites, GPS signals are provided by satellites based on a precise timeframe, and a client device knowing the timeframe may calculate its position from signals received from multiple GPS satellites based on the times the client device receives the signals. Techniques such as these are typically referred to as Time Delay of Arrival (TDOA) techniques. Second, client devices may infer relative positions from radio signals such as those propagated by wireless networks. For example, in the Institute of Electrical and Electronics Engineers' (IEEE) 802.11 standard for wireless local area networks (WLANs), and in proposed revisions to the standard such as 802.11k and 802.11v, a client device may infer its position relative to a wireless access point by monitoring the strength of signals received from a wireless access point to which it has established a connection. Because radio frequency signals degrade at a known rate as they propagate away from the device generating the signals, a client device receiving the signals may compare the received signal strength (RSS) of the signal to its known original strength to infer how far the signal has traveled since generation.

SUMMARY OF INVENTION

As public wireless networks operated by companies and/or municipalities have grown in popularity and number, so has the desire for services that take advantage of a user's location and, therefore, the desire for a reliable form of location calculation for client devices. A client device seeking to interact with a service may calculate its location and provide the location to a location-based service such that services may be provided based on the location of the client device. In some embodiments of the invention, wireless access points in wireless networks may be adapted to broadcast location data indicating their own locations to all other wireless access points and client devices within range. Devices receiving the location data may use the received location data to determine their own locations and may use the determined locations to access location-based services.

The client device may be configured to extract location data from control messages and/or announcement transmissions. The location data may be encoded in control messages or announcement transmissions that are made by the wireless access point, and may be processed by client devices not connected to a network through the wireless access point. Layer 2 control messages, such as a beacon, may be used as control messages or announcement transmissions for this purpose. Location data may be encoded as one or more information elements in a field defined as optional according to a standard protocol for such a message.

In one embodiment, there is provided a method comprising encoding in a wireless access point location data describing a physical location of the wireless access point and transmitting, from the wireless access point, at least one announcement transmission comprising the location data.

In another embodiment, there is provided a method of operating a client device in a network environment comprising a plurality of wireless access points. In the network environment, at least a portion of the wireless access points are within range of the client device. The method comprises receiving at least one announcement transmission from each wireless access point in the portion and reading location data from each announcement transmission of the at least one announcement transmission from each wireless access point in the portion. The read location data describes a location of each wireless access point in the portion. The method further comprises calculating a calculated location of the client device based at least in part on the location data and providing an indicator of the calculated location to at least one consumer of location data.

In a further embodiment, there is provided a client device comprising a network interface and a processor. The network interface is adapted to receive at least one control message from at least one wireless access point within range of the client device, communicate a calculated location of the client device to at least one consumer of location data, and read location data from each control message of the at least one control message from each wireless access point of the at least one wireless access point within range of the client device. The location data read by the network interface describes a location of each wireless access point. The processor is adapted to calculate a calculated location of the client device based at least in part on the location data read from the at least one announcement transmission.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A, 3B, 3C, and 3D are diagrams of exemplary formats for encoding location data for transmission, in accordance with embodiments of the invention;

DETAILED DESCRIPTION

Figure 1A:
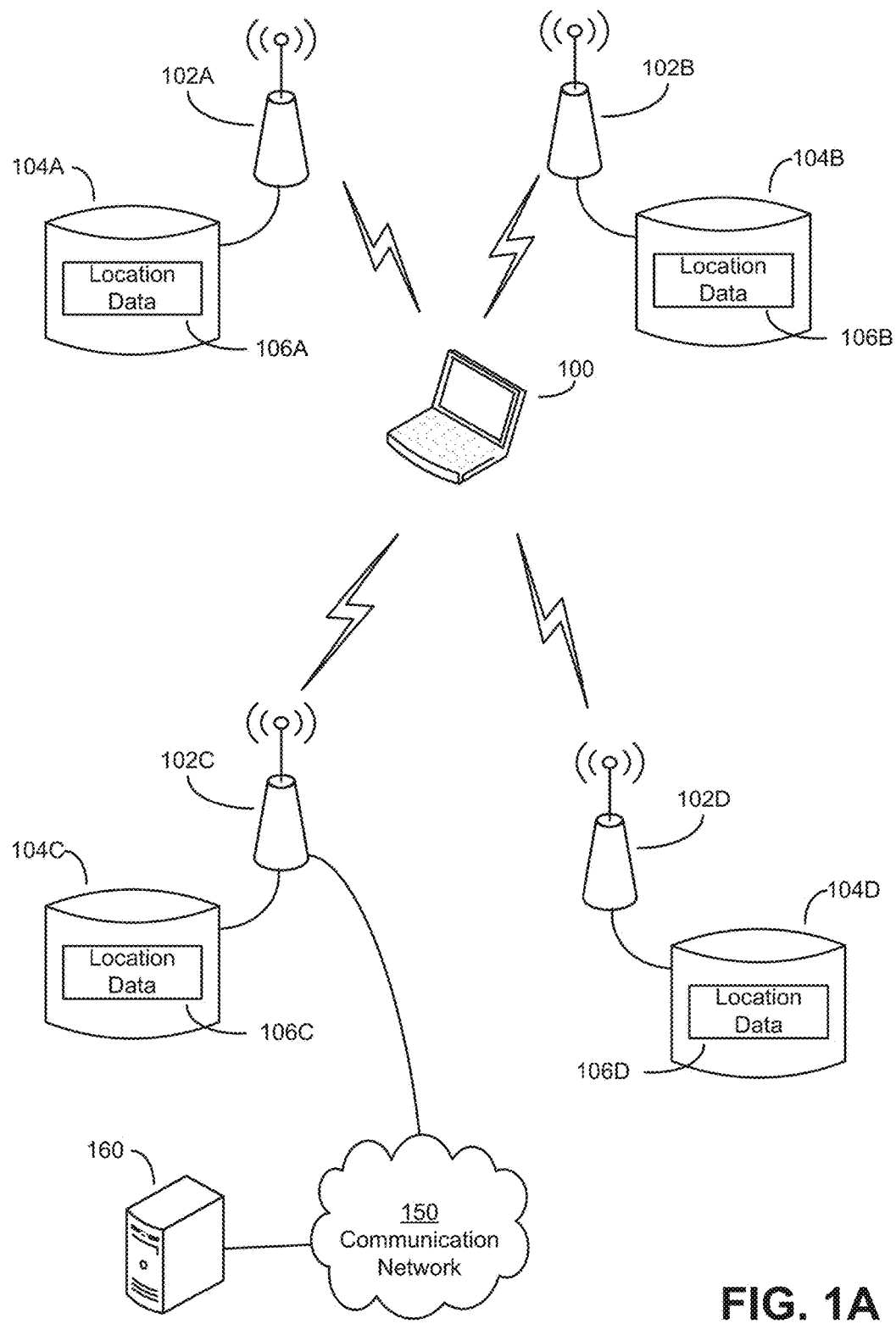
FIG. 1A is a diagram of an exemplary computer system in which embodiments of the invention may act.

As more and more electronic devices with mobile wireless Internet capabilities have been introduced into the market, the demand for wireless Internet access has soared. Responding to these demands, companies have introduced wireless networks over large areas. Some wireless networks have been installed as wireless wide area networks (WWANs) operating according to, for example, cellular telephony protocols, while other have been installed as a network of wireless local area networks (WLANs). For example, companies such as Microsoft MSN, Google, and EarthLink have installed city-wide WiFi WLAN networks in cities such as San Francisco, Phoenix, Portland, and Tai Pei. Typically, though not exclusively, these networks are designed to be accessed by mobile client devices, such as personal digital assistants (PDAs), smart phones, laptop personal computers, and others. As these networks have grown in popularity, both the companies/municipalities operating the wireless networks and the users of the wireless networks have sought to make the networks more interactive by, for example, offering services to users based on the location of a user's client device. Such services, for example, may provide data such as maps of the area in which a client device is located or listings of businesses or particular types of business (e.g., restaurants) near the client device.

Applicants have appreciated that conventional methods of location detection have, for a number of reasons, limited success in providing a location to a client device of a WWAN. For example, RSS techniques depend on receiving high quality signals from access points and satellites, and further require that the client device receive multiple signals before it is able to calculate its position. Such techniques may therefore be unreliable in some situations as it may not be feasible to expect a client device to receive multiple high-quality signals. Further, conventional TDOA techniques GPS) typically require specialized hardware to detect and process the signals generated by the TDOA system. Conventional techniques are also limited in that many such techniques (such as those implemented in IEEE 802.11 wireless networks) require that a client device establish a connection to a wireless access point prior to receiving location signals and calculating its position. As a client device may only connect to a single wireless access point at a time, such techniques are limited in their ability to draw location information from multiple sources and therefore are limited in their ability to calculate a precise location for a client device.

Applicants have recognized that it may be advantageous, then, to provide systems and processes for providing location data to client devices such as mobile devices such that the client devices may determine their locations based on location data retrieved from one or more sources without performing significant processing.

In view of the foregoing, one embodiment of the present invention is directed to wireless access points in wireless networks which may be adapted to transmit location data indicating their own locations to other devices, including other wireless access points and client devices, within range. In some embodiments of the invention, the location data may be embedded in a control message or announcement transmission transmitted by a wireless access point of a wireless network, which conventional client devices are typically configured to monitor. A message conventionally used to broadcast network characteristics necessary for a client device to establish a connection to the wireless access point may serve as a control message or announcement transmission. For example, in terms of the Open Systems Interconnect (OSI) layered model of a network, layer 2 control messages may be used for control messages. In some embodiments of the invention, a beacon or probe response, or any other suitable transmission may be a control message or announcement transmission and may comprise advertisement data that may be displayed to a user of a client device. The other wireless access points and client devices may receive the location data broadcast by the wireless access point without establishing a connection to the wireless access point. Devices receiving the location data may use the received location data to determine their own locations, and may provide the determined locations to consumers of location data.

FIG. 1A shows an exemplary computer system in which some embodiments of the invention may act. It should be appreciated that embodiments of the invention may act in any suitable computer system and are not limited to being implemented in the illustrative computer system shown in FIG. 1A.

The computer system of FIG. 1A comprises a client device 100 in communication with four wireless access points 102A, 102B, 102C, and 102D. The client device 100 may be any suitable electronic device for receiving wireless signals, mobile or immobile, such as a desktop or laptop personal computer, a personal digital assistant (PDA), or smart phone. Each wireless access point 102A, 102B, 102C, and 102D may be any suitable wireless signal generator generating signals according to one or more wireless networking protocols. For example, a wireless access point may be a WiFi access point operating according to the IEEE 802.11 standard for WLANs, may be cellular-style wireless access points operating a Wireless Wide Area Network (WWAN) according to any suitable WWAN protocol (e.g., the Global System for Mobile Communications (GSM)), personal area network (PAN) protocols such as Bluetooth, other protocols such as the Worldwide Interoperability for Microwave Access (WiMAX) protocol and the Ultra-wideband (UWB) protocol, or any other suitable wireless protocol. The wireless access points may be operating according to the same wireless protocol or may be operating according to different wireless protocols.

The client device 100 may or may not have a connection open to one or more wireless access points 102A, 102B, 102C, and 102D, but is within range of each of the wireless access points and is capable of receiving transmissions from the wireless access points. As shown in FIG. 1A, each wireless access point 102A, 102B, 102C, and 102D is associated with a data store 104A, 104B, 104C, and 104D storing information comprising location data 106A, 106B, 106C, 106D. Data store 104A, 104B, 104C, and 104D may be a part of a wireless access point (such as wireless access point 102A, 102B, 102C, or 102D) or a storage medium coupled to a wireless access point in any suitable manner. Location data, as will be discussed in greater detail below, may be any suitable information indicating a location of the wireless access point, such as a latitude/longitude combination indicating a geographic location or a floor/room number indicating a location in a building. It should be appreciated that the location data may be any suitable information stored in any suitable manner in a data store, as embodiments of the invention are not limited in this regard.

In some embodiments of the invention, client device 100 may be adapted to determine its location from location data transmitted by each of the wireless access points 102A, 102B, 102C, and 102D. In one such embodiment of the invention, using the location data provided by the wireless access points indicating a position of each of the wireless access points, the client device 100 may be configured to infer its position in a space. This determination may be made in any suitable manner.

Figure 1B:
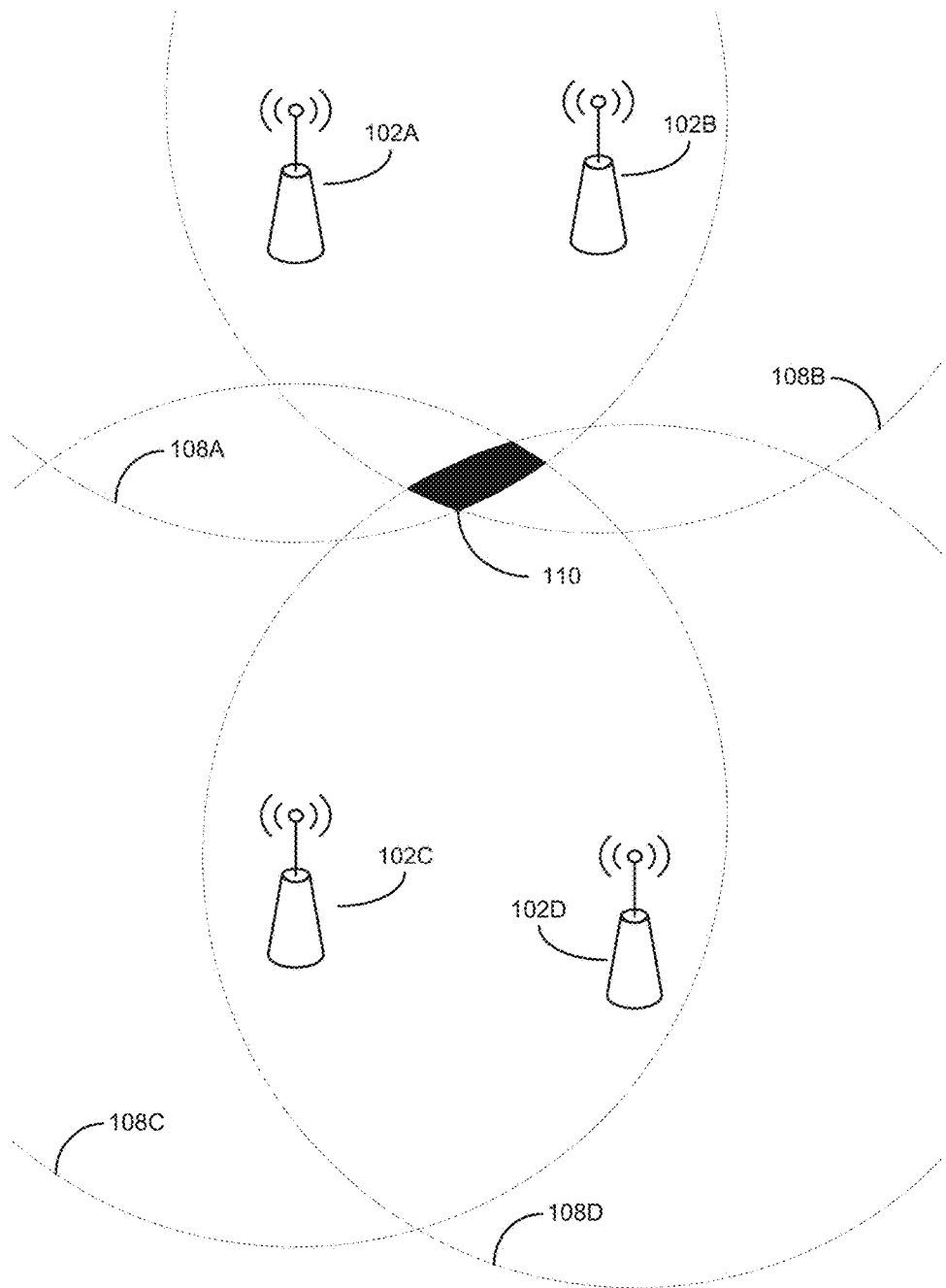
FIG. 1B is a diagram of the exemplary computer system of FIG. 1A showing the range of wireless access points and how location data transmitted by wireless access points may be used to determine a location of a client device.

For example, a client device 100 may determine an intersection of the broadcast area of each wireless access point of which it is within range and infer the location of the intersection based on the location data. FIG. 1B shows the ranges 108A, 108B, 108C, and 108D of each of the wireless access points 102A, 102B, 102C, and 102D along with the intersection of the ranges 110. Clearly, if the client device 100 is within communicative range of each of the wireless access points, then the client device 100 is within the area indicated as the intersection of the ranges 110. The client device 100 may then, knowing the locations and ranges of each of the wireless access points 102A, 102B, 102C, and 102D, use any suitable technique, such as well-known techniques, to determine the location of the intersection 110 of the ranges and therefore determine its location.

As a further example of techniques which may be implemented by embodiments of the invention to determine a client device's location from signals received by the client device from a wireless access point, a client device 100 may be adapted to accept as its position the location of a wireless access point as contained in the announcement transmission received from the wireless access point. For example, a client device 100 within range of wireless access point 102A may use as its own location the location data encoded in wireless access point 102A, transmitted by wireless access point 102A, and received by client device 100. If a client device 100 operating according to this example is within range of multiple wireless access points, then the client device may select any wireless access point within range, or may choose the wireless access point having the strongest signal as detected by the client device 100. As a further example, in some embodiments of the invention the client device 100 may be adapted to perform any suitable calculation on the location data received, such as averaging the location data received from the wireless access points, to determine the location of the client device. In some embodiments of the invention, the calculation may be an average of the location data received from the wireless access points weighted according to the strength of the signals received from the wireless access points.

It should be appreciated that embodiments of the invention may transmit location data in any suitable manner, and that client devices may use received location data to determine their location in any suitable manner, as embodiments of the invention are not limited in these respects.

Regardless of the specific mechanism used by client 100 to determine its location, the identified location may be provided to one or more consumers of location data, that may be either internal or external to client 100. In the embodiments of FIG. 1A, a server 160 may act as a consumer of location information. As illustrated, server 160 may be coupled to network 150. Though client 100 need not establish a connection through any access point 102A, 102B, 102C, or 102D to obtain location data, client 100 may establish a network connection for other reasons—including communicating with server 160 or other network devices. Accordingly, an agent within client 100 may initiate a connection or use an existing connection to provide location information to server 160, Server 160 may respond with location-specific information, such as a map of the area in which the client device 100 is located, a listing of businesses near the client device 100, or any other suitable location-specific information.

Figure 2:
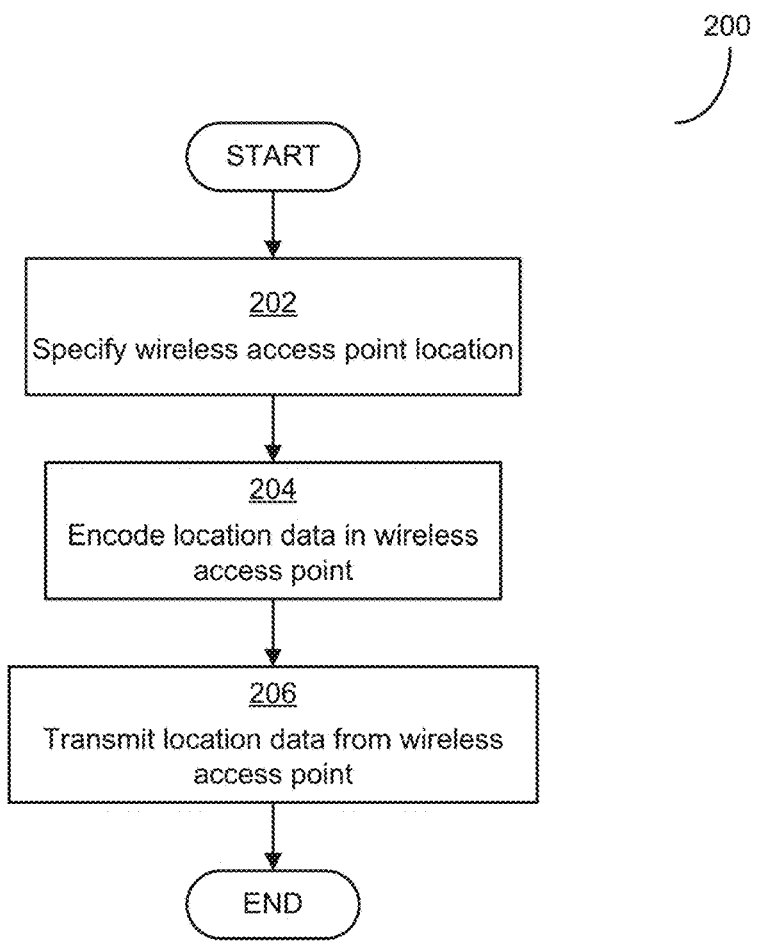
FIG. 2 is a flowchart of an illustrative process for transmitting location data from a wireless access point which may be implemented in accordance with embodiments of the invention.

FIG. 2 shows a flowchart of an illustrative process 200 for operating a wireless access point such as wireless access points in accordance with one embodiment of the invention. It should be appreciated that embodiments of the invention are not limited to implementing the illustrative process 200, and may implement any suitable process for operating a wireless access point.

Process 200 begins in block 202, wherein a location of the wireless access point is specified. As discussed above, the specified location of the wireless access point may be a geographic location, such as a latitude/longitude combination or a street address of building in which or near which the wireless access point is installed, may be a location within a building, such as a floor and/or room number of a space in which the wireless access point is installed in a building, or may be any other suitable indicator of a physical location of a wireless access point. The physical location of a wireless access point may be a single type of location, or may be multiple types of physical locations (i.e., the specified location may be both a geographic location and a location within a building). In some embodiments of the invention, the location data specified in block 202 may be entered by a user of the wireless access point, such as an administrator of the wireless access point and/or an administrator of a network to which the wireless access point is connected. As is discussed in greater detail below in conjunction with FIG. 5, in some such embodiments a wireless access point may comprise a user interface by which a user may specify the location. In alternative embodiments of the invention, a wireless access point operating in accordance with some embodiments of the invention may be adapted to detect its physical location. This detection may be carried out in any suitable manner. For example, a wireless access point may comprise hardware and/or software that may be used to interact with one or more location systems, such as the GPS location system discussed above, and thus determine its location based on signals received from the one or more location systems. Alternatively, a wireless access point may be adapted to determine its location based on location data received from other, nearby wireless access points. A wireless access point may determine its location from location data received from other wireless access points in any suitable manner, such as by the exemplary techniques discussed below or by any other technique.

Once a physical location of the wireless access point has been specified in block 202, data indicating the physical location is encoded in the wireless access point in block 204. The location data may be encoded in a wireless access point in any suitable format on any suitable storage medium, as embodiments of the invention are not limited in this respect. For example, the location data may be stored on a storage medium 104 as shown in FIG. 1A, which may be a part of a wireless access point 102 or may be communicatively coupled to a wireless access point 102. The location data may be alphanumeric data which was specified in block 202 (either entered by a user, retrieved from another wireless access point, or determined from signals retrieved from other wireless access points or a location service) or may be any data related to the location specified in block 202.

Encoded location data may then be transmitted by the wireless access point in block 206. As discussed above, the location data may be transmitted from the wireless access point in any suitable manner. In some embodiments of the invention, the location data may be transmitted by the wireless access point as a portion of an announcement transmission which is transmitted by the wireless access point. An announcement transmission may be a beacon which is periodically broadcast from the wireless access point to be received by all devices within range of the wireless access point (e.g., other wireless access points and client devices) or may be a response to a probe request received by the wireless access point from a device requesting information about the wireless access point. An announcement transmission in any form may be transmitted to devices which have an open connection to the wireless access point, are establishing a connection to the wireless access point, or are not connected to the wireless access point.

It should be appreciated that while, for clarity, embodiments of the invention may be described below as receiving the location data transmitted by the wireless access point as part of a beacon transmission, embodiments of the invention are not limited to transmitting or receiving location data as part of a beacon transmission and may transmit/receive location data to and from a wireless access point in any suitable manner.

In embodiments of the invention transmitting location data as a portion of an announcement transmission, the location data may be transmitted in any suitable manner. FIGS. 3A-3D show exemplary techniques for transmitting location data as part of an IEEE 802.11 beacon transmission. It should be appreciated that embodiments of the invention may operate according to any suitable protocol and are not limited to operating in accordance with the IEEE 802.11 protocol. Additionally, embodiments of the invention which are implemented to operate with the IEEE 802.11 protocol are not limited to implementing the exemplary techniques shown in FIGS. 3A-3D and may implement any suitable technique.

According to the IEEE 802.11 standard, a beacon has an options field in which an "information element" may be inserted without deviating from the 802.11 protocol. In the embodiment illustrated in FIG. 3A, location data is transmitted as an information element. FIG. 3A shows one possible arrangement for location data in a beacon transmission encoded within an IEEE 802.11 Information Element (IE) 300A. In accordance with the IEEE 802.11 standard, IE 300A comprises an IE identifier (IE ID) 302, which is one byte indicating the particular type of IE, an IE length 304, which is one byte indicating the amount of data included in the IE 300A, and an Organization Unique Identifier (OUI) 306, which is three bytes indicating a particular company which is generating the data contained in the IE 300A. In some embodiments of the invention, the IE ID 302 may have a value of 221 and the OUI may be assigned a value of "00-50-F2," which indicates the LE 300A has been generated by the Microsoft Corporation of Redmond, Wash. In accordance with the IEEE 802.11 standard, the IE 300A further comprises a payload. In the example of FIG. 3A, the payload of IE 300A comprises an OUI Type 308, further indicating the type of the IE 300A which may have a value of 6 indicating that it is an IE associated with Microsoft's Proximity Service Discovery technology. The payload of IE 300A further comprises a Namespace 310, which may be a textual indicator of the technology used to generate the IE 300A (e.g., a uniform resource identifier (URI) for the technology) or, to make the payload smaller, a value related to a textual indicator (e.g., a hash value for the URI).

In the example of FIG. 3A, the payload of IE 300A further comprises at least one of a combination of a type 312 and a value 314. The one-byte type 312 may indicate the type of the location data included in the value field 314. The type 312 and value 314 fields may store any suitable value, as the invention is not limited in this respect. FIG. 3B shows examples of ways in which physical location data that may be encoded in the value field 314 of the LE 300A. If the type field 312 holds a hexadecimal value of 0x1, for example, then the value field 314 may be a LatLong field 320 storing two four-byte float numbers indicating a latitude and longitude of the wireless access point. The latitude value may be a decimal value ranging from −90 to +90, while longitude may be a decimal value ranging from −180 and +180, with, for example, at least five significant digits after the decimal point. Alternatively, if the type 312 is a hexadecimal value 0x2, then the value field may hold an Altitude 322 value, where the value may be a two-byte short integer indicating the wireless access point's altitude relative to sea level in meters. Lastly, if the type 312 is a value of 0x3, then the value field 314 may store an error value 324 as, for example, a two-byte short integer value indicating an estimate, in meters, of the radius of an error circle around the wireless access point.

In some embodiments of the invention, an information element transmitted by a wireless access point may have a slightly different payload than that shown in the example of FIG. 3A. FIG. 3C shows a structure for an IE 300C having the same fields 302-312 and 314 as the IE 300A of FIG. 3A, but having an additional field 316 indicating a length of the value field 314. Transmitting the length of the value field 316 may be advantageous in situations where, for example, the value 314 is of a non-standard length. For example, while the lengths of fields LatLong 320, Altitude 322, and Error 324 of FIG. 3B may be known in advance because they are established standards, FIG. 3D shows examples of values that may be stored in value 314 which may not have lengths known in advance. For example, if the type 312 is a hexadecimal value 0x81, then the value 314 may be a Floor Name 330 which may store up to 16 bytes of text (e.g., as a wide char string). Because there exists per se no standard for naming floors, the value and length of Floor Name 330 may vary from wireless access point to wireless access point and, as such, the IE 300B may have a Length 316 field. Additionally, if the type 312 is 0x82, then the value 314 may be a Room Name 332 which may similarly store up to 24 bytes of text (e.g., as a wide char string). Lastly, if the type 312 is 0x83, then the value 312 may be Meta Data 334 storing up to 64 bytes of any type of information in any format, as may be set, for example, by an administrator of a wireless access point.

Figure 4:
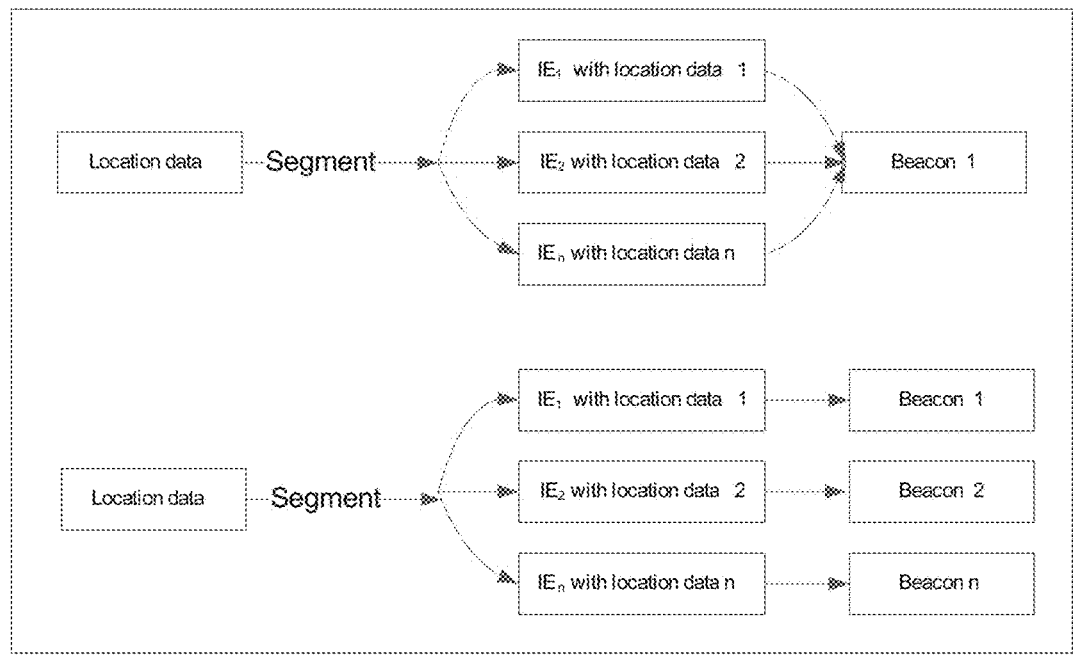
FIG. 4 is a diagram of exemplary schemes for segmenting advertisement data for transmission to client devices, in accordance with one embodiment of the invention.

As discussed above, a wireless access point 102 is not limited to storing and transmitting a single type of location data, as embodiments of the invention may implement wireless access points storing and transmitting two or more types of location data. For example, a wireless access point may store both a geographic location (e.g., latitude and longitude) and a location in a building (e.g., a floor and/or room name). Wireless access points which are adapted to store and transmit multiple types of location data may do so in any suitable manner. Exemplary formats for transmitting multiple types of location data are shown in FIG. 4. It should be appreciated that embodiments of the invention which transmit multiple types of location data may do so in any suitable manner and are not limited to implementing the exemplary techniques shown in FIG. 4.

As shown in FIG. 4, in accordance with some embodiments of the invention location data stored by a wireless access point 102 may be segmented into multiple information elements (IEs) (e.g., $IE_1$). These IEs may be any suitable structure for transmitting location data, such as the exemplary IE formats discussed above in conjunction with FIGS. 3A-3D. In some embodiments of the invention, the location data, once segmented into multiple IEs, may then be combined into a single beacon comprising multiple IEs (e.g., beacon 1). The collection of IEs may then be transmitted in the single beacon from the wireless access point for receipt by other devices (e.g., client devices and other wireless access points) within range of the wireless access point. Alternatively, each IE containing a type of location data (e.g., $IE_1$) may be transmitted by a separate beacon (e.g., beacon 1, beacon 2, beacon n).

In some embodiments of the invention, location data may be segmented into multiple IEs and transmitted in one or more beacons. For example, a wireless access point 102 storing a street address as location data may require more data to completely identify its street address than may be stored in a single value field of an information element (e.g., meta data field 334). In such embodiments, the location data may be segmented into multiple information elements, and the payloads of the IEs adapted to comprise indicators of the number of IEs into which the location data has been segmented and the particular order of IEs in the sequence of IEs storing the location data (i.e., that the IE is the second of three IEs) such that a device receiving the IEs from the wireless access point transmitting the location data may be informed that the segmentation has occurred and that the device requires multiple IEs before the device will have fully received the location data.

It should be appreciated that while FIGS. 3A-3D and 4 illustrate transmitted location data in terms of IEEE 802.11 beacon transmissions and information elements, embodiments of the invention are not limited to being implemented in IEEE 802.11 networks and are not limited to transmitting location data in the information elements described by the IEEE 802.11 protocol or any other information element. Embodiments of the invention may operate on any suitable protocol and ma transmit any suitable type or types of location data in any suitable manner.

Figure 5:
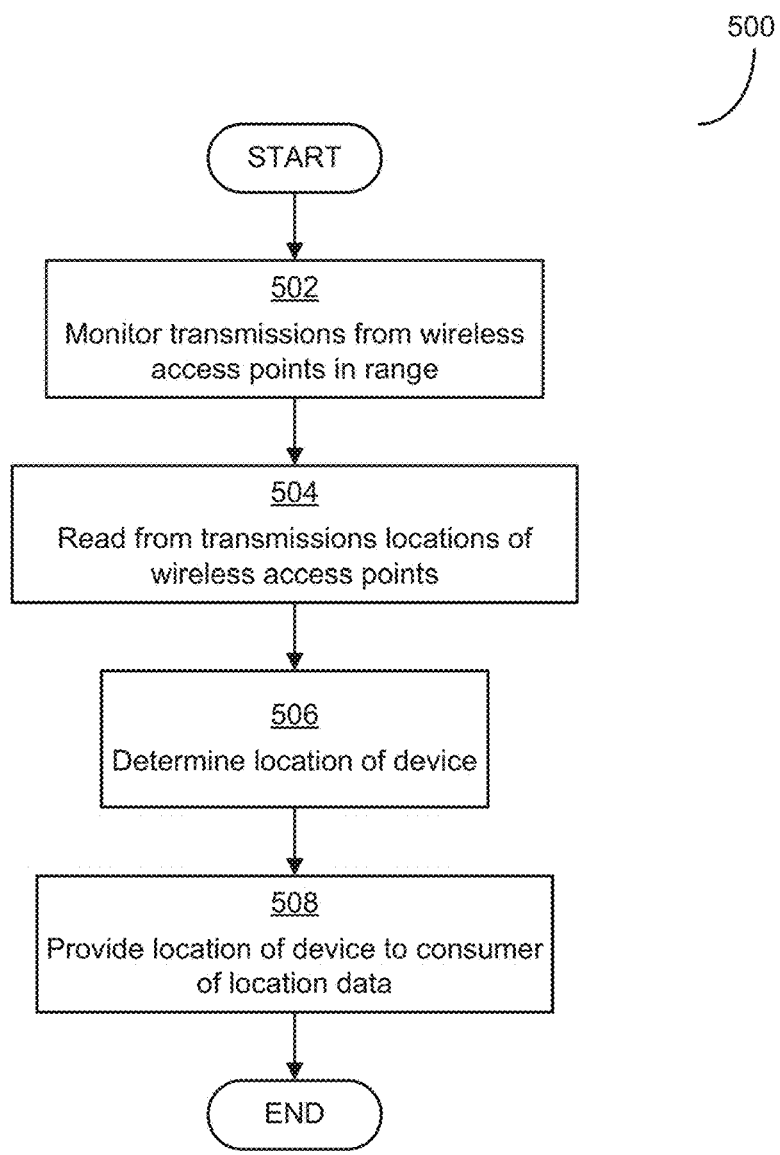
FIG. 5 is a flowchart of an illustrative process for calculating the location of a client device based on received location data which may be implemented in accordance with one embodiment of the invention.

Location data transmitted by a wireless access point 102 may be received by other devices, including client devices and other wireless access points. The other devices may then determine their own positions based at least in part of the received location data. This determination may be made in any suitable manner, as embodiments of the invention are not limited in this respect. FIG. 5 shows an exemplary process 500 which may be implemented by devices in accordance with some embodiments of the invention, but it should be appreciated that embodiments of the invention may not implement the exemplary process 500 and may implement any other suitable technique for determining a location of the device.

Process 500 begins in block 502, wherein the device e.g., a client device such as a laptop personal computer or FDA, or another wireless access point) monitors transmissions from wireless access points within range of the device. A wireless access point may be within range of the device, for example, when transmissions sent from the wireless access point may be received by the device at sufficient quality for information encoded in the transmissions to be extracted by the device. In the IEEE 802.11 standard, for example, wireless access points are typically within range of the device if the wireless access points are within 100 meters of the device.

Block 502 may comprise receiving transmissions from wireless access points to which the device has established a connection or may comprise receiving transmissions from all wireless access points within range, whether or not the client has established a connection to a wireless access point. In some embodiments of the invention, block 502 may comprise transmitting from the device to all wireless access points within range a probe request indicating that wireless access points receiving the probe request should respond with information about the wireless access points, including the location data stored by the wireless access points.

Once the device has received transmissions from one or more wireless access points within range in block 502, then in block 504 the location data of the wireless access points is read from the transmissions. In some embodiments of the invention, this may comprise reading from the transmissions information elements storing the location data, such as the information elements (IEs) discussed above in conjunction with FIGS. 3A-3D and 4. Though, it should be appreciated that embodiments of the invention may read from transmissions location data stored in any suitable manner.

The location data from the transmissions received by the device may then be processed in block 506 to determine a location for the device. This determination may be made in any suitable manner, such as the exemplary techniques discussed above in conjunction with FIG. 1B. For example, the device may determine from the transmissions a location of each of the wireless access points within range of the device, The device may then determine a communicative range of each of the wireless access points (i.e., a probable maximum distance a signal generated by the wireless access point will propagate, such as approximately 100 meters for IEEE 802.11). An intersection of the ranges of the wireless access points may then be determined (shown in FIG. 1B as intersection 110), and an estimated location of the intersection of ranges may then be determined based on the ranges and locations of the various wireless access points. If a device has only received location data from a single wireless access point, then the intersection of the ranges may be the full range of the single wireless access point. The device may then assume its own location to be within the intersection of the ranges. As it is dependent on the placement of wireless access points and ranges of the wireless access points, the intersection of ranges may be an area of any size, from a very large area (a square mile or a few city blocks) to a very small area (a few feet square). In some embodiments of the invention, then, a device may improve its estimated location by performing any suitable analysis on the signals received from one or more wireless access points, such as Received Signal Strength (RSS) techniques adapted to estimate a device's distance from one or more particular wireless access points and may then use the estimate(s) to narrow the intersection of ranges. It should be appreciated, however, that embodiments of the invention which determine a device's location from an intersection of wireless access point ranges are not limited to performing any act or acts to improve the estimation of the device's location, and may instead rely on the estimate yielded by the intersection of ranges.

It should be appreciated that, in some embodiments of the invention, determining a location of the device may comprise determining multiple locations of the device. For example, if the device is within range of wireless access points transmitting multiple types of location data (e.g., geographic location data and data describing location within a building), then the device may be adapted to determine a location for the device based on each of the types of data received from the wireless access points. Thus, the determination of block 504 may comprise making multiple, separate determinations, such as a determination of geographic location of the device and a determination of the device's position within a building. Embodiments of the invention, however, may not be adapted to determine multiple locations of the device and may instead determine a single location of the device based on location data provided by wireless access points.

Once a device has determined its location (or an estimate thereof) in block 506, the location may, in some embodiments of the invention, be provided to one or more consumers of location data in block 508. For wireless access points, a consumer of location data may be the storage medium 104 storing the location of the wireless access point for transmission to other devices. For client devices, location data may provided to a consumer through a service, or the consumer may be an agent or other software component that provides location data to a service that provides information or other services to a client based on the client's location. For example, mapping software may use the location of the client device to provide a map of the area in which the client device is. Consumers of location data for client devices may additionally or alternatively be software adapted to provide a user of a client device with information regarding his or her surroundings, such as descriptions of nearby businesses or services (e.g., restaurants by which a user may be walking). In some embodiments of the invention, the consumers of location data may be disposed on the client device, while in other embodiments of the invention the consumers of location data may be located in whole or in part on another device to which the client device may communicatively couple. For example, the client device may provide a server with the location of the client device, and the server may use the location to provide a user with advertisements related to his or her location.

It should be appreciated that embodiments of the invention are not limited to implementing the exemplary process 500 shown in FIG. 5, and that embodiments of the invention may implement any other suitable process for determining a location based on location data received from one or more wireless access points.

Figure 6:
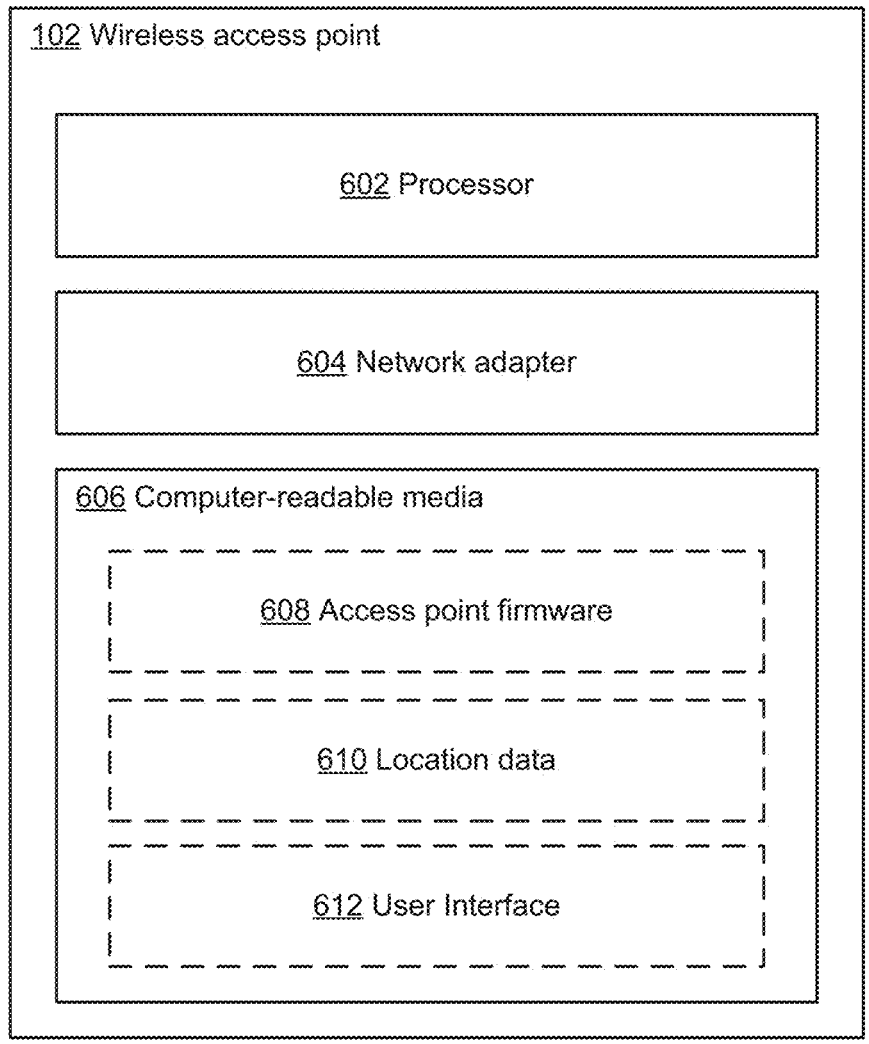
FIG. 6 is a diagram of an exemplary wireless access point with which embodiments of the invention may act.
Figure 7:
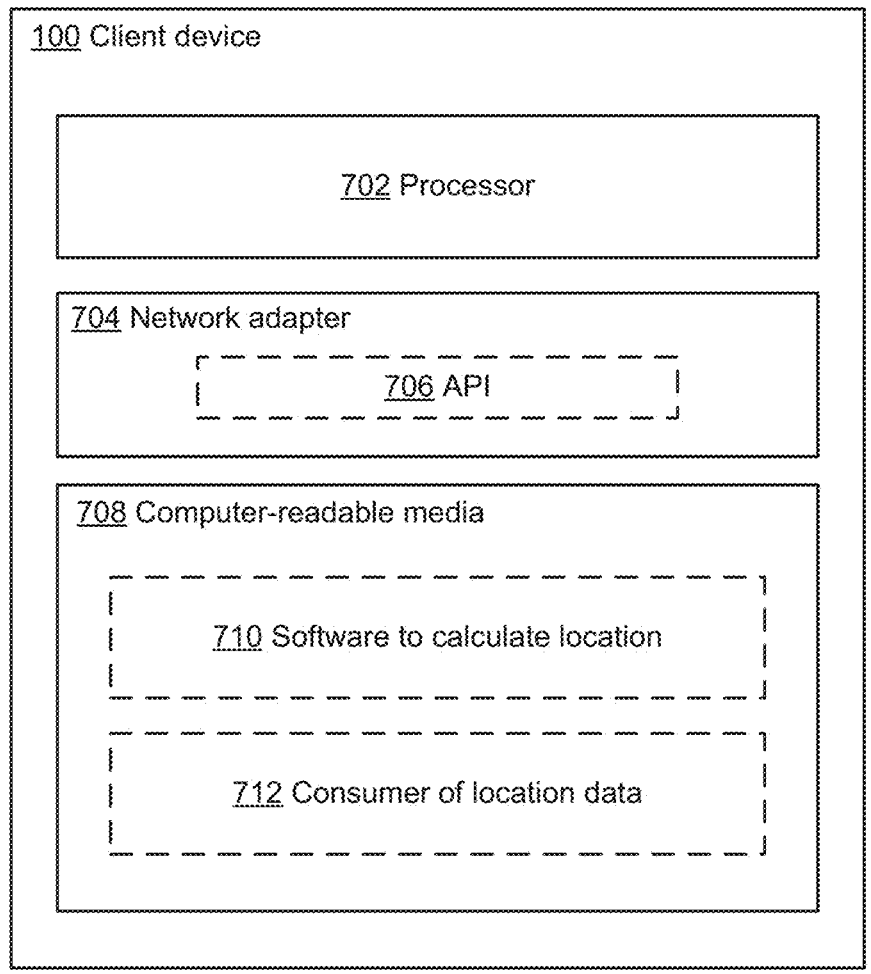
FIG. 7 is a diagram of an exemplary client device with which embodiments of the invention may act.

The aspects of the present invention described herein may be implemented on any of numerous computer system configurations and are not limited to any particular type of configuration. FIGS. 6-7 show various computer systems in which embodiments of the invention may act, though others are possible. It should be appreciated that FIGS. 6-7 are intended to be neither a depiction of necessary components for a computing device to operate as a wireless access point or client device with embodiments of the invention, nor a comprehensive depiction.

FIG. 6 shows an illustrative wireless access point 102 (which may be any of wireless access points 102A, 102B, 102C, and 102D) which may be implemented as a wireless access point in accordance with embodiments of the invention. Wireless access point 102 comprises a processor 602, a network adapter 604, and computer-readable media 606. Network adapter 604 may be any suitable hardware and/or software to enable the wireless access point 102 to communicate with any other suitable computing device over any suitable computing network. The computing network may be any suitable wired and/or wireless communication medium or media for exchanging data between two or more computers, including the Internet. For example, the computing network may be, at least in part, a wireless network operating according to any suitable wireless networking protocol, such as IEEE 802.11, GSM, Bluetooth, WiMAX, UWB, and/or any other suitable protocol. In some embodiments of the invention, wireless access point 102 may comprise two network adapters 604 to enable the wireless access point 102 to communicate with a wired computing network and a wireless computing network, and exchange data between the two. Computer-readable media 606 may be adapted to store data to be processed and/or instructions to be executed by processor 602. Processor 602 may process data and execute instructions. The data and instructions may be stored on the computer-readable media 606 and may, for example, enable communication between components of the wireless access point 102.

In accordance with some embodiments of the invention, the data and instructions stored on computer-readable media 606 may comprise access point firmware 608, which may be software executed by the processor 602 instructing the wireless access point 102 to perform any suitable function, such as retrieving location data from a data store for transmission, encoding the location data in a control transmission, and generating a control transmission. The computer-readable media 806 may further store location data 610. The location data 610 may be any suitable data describing a location of the wireless access point, and may be stored in any suitable format. For example, location data may be a latitude/longitude pair describing a geographic location of the wireless access point 102, or may be a floor and/or room name describing a location of the wireless access point 102 within a building. The location data may be encoded by an administrator of the wireless access point or may be retrieved from any other suitable source, such as from a location system such as GPS or from another wireless access point within range of the wireless access point 102. In some embodiments of the invention, location data 610 may be any combination of two or more types of location data. Further, computer-readable media 606 may, in some embodiments of the invention, comprise a user interface 612 for a user and/or administrator of a wireless access point 102 to specify a location of the wireless access point 102. The user interface 612 may be any suitable interface, including any suitable graphical or textual interface to be displayed to a user, or any suitable software receiving input values from any other suitable user interface (e.g., a keypad on the wireless access point 102).

FIG. 7 shows an exemplary client device 100. As discussed above, any suitable computing device, mobile or immobile, may be used as a client device 100 in accordance with embodiments of the invention. Client device 100 may be a computing device designed for multiple purposes and for use by a user, such as a desktop personal computer, a laptop personal computer, a server, a personal digital assistant (PDA), a smart/mobile telephone, or any other suitable electronic device. Alternatively, client device 100 may be any computing device not intended for typical use by a user or intended for a single purpose or limited purposes, such as a server, a rack-mounted. networking device, or a standalone networking device such as a switch, hub, router, access point, hardware firewall, or any other suitable electronic device.

Client device 100 comprises a processor 702, a network adapter 704, and computer-readable media 708. Network adapter 704 may be any suitable hardware and/or software to enable the client device 100 to communicate with any other suitable computing device over any suitable computing network. The computing network may be any suitable wired and/or wireless communication medium or media for exchanging data between two or more computers, including the Internet. For example, the computing network may be, at least in part, a wireless network operating according to any suitable wireless networking protocol, such as IEEE 802.11, GSM, Bluetooth, WiMAX, UWB, and/or any other suitable protocol. Network adapter 704 may further comprise an Application Programmer Interface (API) 706 to enable interaction between the network adapter 704 and applications executing on the client device 100. API 706 may provide executable functions to applications on the client device 100 such that the applications may request that network adapter 704 begin monitoring for transmissions from wireless access points, provide location data from transmissions, or any other suitable function. Computer-readable media 706 may be adapted to store data to be processed and/or instructions to be executed by processor 702. Processor 702 enables processing of data and execution of instructions. The data and instructions may be stored on the computer-readable media 706 and may, for example, enable communication between components of the client device 100.

In accordance with some embodiments of the invention, the data and instructions stored on computer-readable media 708 may comprise software 710 to calculate a location of the client device 100. Software 710 may be any suitable software to calculate a location of the client device 100 according to any of the techniques described above or in any other suitable manner. Software 710 may, in some embodiments of the invention, be adapted to control network adapter 704 using the API 706 to monitor and read location data from transmissions of wireless access points, or monitor and read other parameters of transmissions received from wireless access points (e.g., received signal strength (RSS)). In some embodiments of the invention, software to calculate location 710 may be implemented as a software component of network adapter 704, such that the data output by API 706 of network adapter 704 may be the location of the client device 100 and not location data received from wireless access points.

Computer-readable media 708 may, in some embodiments of the invention, further comprise computer-executable instructions that implement software components acting as one or more consumers of location data 712. Consumers of location data 712 may be any suitable software to provide information to a client device and/or a user of the client device based on a location of the client device. In some embodiments of the invention, the consumer of location data 712 on the client device 100 may be a portion of a consumer of location data, and the consumer of location data 712 may be adapted to communicate with other client devices and/or servers through network adapter 704 to retrieve data for use in determining a service and/or information to provide to client device 100. Consumer of location data 712 may be adapted to use API 706 to retrieve a location of the device from network adapter 704 and/or may be adapted to interact with software 710 which calculates the location of the client device and which may provide the location to the consumer of location data 710.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method performed on a hardware computing device, the method comprising:
   receiving, by the hardware computing device, a plurality of control messages, where each control message comprises location information in an information element of an options field of the control message, where the information element comprises a payload that includes a type field and a value field where:
   a. in accordance with the type field comprising a first value, the value field indicating a longitude and a latitude of a device that transmitted the control message,
   b. in accordance with the type field comprising a second value, the value field indicating an altitude above sea level of the device that transmitted the control message, and
   c. in accordance with the type field comprising a third value, the value field indicating an estimate of a radius of an error circle around the device that transmitted the control message, and wherein the information element further comprises a unique identifier field that includes a value indicating an organization that generated the location information; and
   determining, by the hardware computing device based on the location information comprised by the received plurality of control messages, a location of the hardware computing device.

2. The method of claim 1 where the information elements of the received plurality of control messages are compliant with the Institute of Electrical and Electronics Engineers' ("IEEE") 802.11 standard.

3. The method of claim 1 where, in accordance with the type field comprising a fourth value, the value field comprises a value that identifies a particular floor of a building.

4. The method of claim 1 where, in accordance with the type field comprising a fifth value, the value field comprises a value that identifies a particular room of a building.

5. The method of claim 1 where, in accordance with the type field comprising a sixth value, the value field comprises administrator-provided metadata, where at least one of the received control messages includes at least two different types of location information.

6. The method of claim 1 where the control messages are beacons or response probes.

7. The method of claim 1 where the at least two different types of location information include geographic location information and building floor and room location information.

8. A hardware computing device comprising:
   a network adapter;
   a processor that is coupled to the network adapter; and
   memory that is coupled to the processor and that includes computer-executable instructions that, based on execution by the processor, configure the hardware computing device to perform actions comprising:
      receiving, by the hardware computing device via the network adapter, a plurality of control messages, where each control message comprises location information in an information element of an options field of the control message, where the information element comprises a payload that includes a type field and a value field where:
      a. in accordance with the type field comprising a first value, the value field indicating a longitude and a latitude of a device that transmitted the control message,
      b. in accordance with the type field comprising a second value, the value field indicating an altitude above sea level of the device that transmitted the control message, and
      c. in accordance with the type field comprising a third value, the value field indicating an estimate of a radius of an error circle around the device that transmitted the control message, and wherein the information element further comprises a unique identifier field that includes a value indicating an organization that generated the location information; and
      determining, by the hardware computing device via the processor based on the location information comprised by the received plurality of control messages, a location of the hardware computing device.

9. The hardware computing device of claim 8 where the information elements of the received plurality of control messages are compliant with the Institute of Electrical and Electronics Engineers' ("IEEE") 802.11 standard.

10. The hardware computing device of claim 8 where, in accordance with the type field comprising a fourth value, the value field comprises a value that identifies a particular floor of a building.

11. The hardware computing device of claim 8 where, in accordance with the type field comprising a fifth value, the value field comprises a value that identifies a particular room of a building.

12. The hardware computing device of claim 8 where, in accordance with the type field comprising a sixth value, the value field comprises administrator-provided metadata.

13. The hardware computing device of claim 8 where at least one of the received control messages includes at least two different types of location information, where the at least two different types of location information include geographic location information and building floor and room location information.

14. The hardware computing device of claim 8 where the control messages are beacons or response probes.

15. At least one hardware computer-readable medium that includes computer-executable instructions that, based on execution by a processor of a hardware computing device, configure the hardware computing device to perform actions comprising:
- receiving, by the hardware computing device, a plurality of control messages, where each control message comprises location information in an information element of an options field of the control message, where the information element comprises a payload that includes a type field and a value field where:
  - a. in accordance with the type field comprising a first value, the value field indicating a longitude and a latitude of a device that transmitted the control message,
  - b. in accordance with the type field comprising a second value, the value field indicating an altitude above sea level of the device that transmitted the control message, and
  - c. in accordance with the type field comprising a third value, the value field indicating an estimate of a radius of an error circle around the device that transmitted the control message,
- and wherein the information element further comprises a unique identifier field that includes a value indicating an organization that generated the location information; and
- determining, by the hardware computing device based on the location information comprised by the received plurality of control messages, a location of the hardware computing device.

16. The at least one hardware computer-readable medium of claim 15 where the information elements of the received plurality of control messages are compliant with the Institute of Electrical and Electronics Engineers' ("IEEE")802.11 standard.

17. The at least one hardware computer-readable medium of claim 15 where, in accordance with the type field comprising a fourth value, the value field comprises a value that identifies a particular floor of a building.

18. The at least one hardware computer-readable medium of claim 15 where, in accordance with the type field comprising a fifth value, the value field comprises a value that identifies a particular room of a building.

19. The at least one hardware computer-readable medium of claim 15 where, in accordance with the type field comprising a sixth value, the value field comprises administrator-provided metadata.

20. The at least one hardware computer-readable medium of claim 15 where at least one of the received control messages includes at least two different types of location information, and where the at least two different types of location information include geographic location information and building floor and room location information; or where the control messages are beacons or response probes.

* * * * *